United States Patent
Nguyen et al.

(10) Patent No.: US 7,523,203 B1
(45) Date of Patent: Apr. 21, 2009

(54) SHARED DISTRIBUTION MEDIA RESOURCES IN A COMMUNICATION NETWORK

(75) Inventors: Thang C Nguyen, Coppell, TX (US); Li Ji, Plano, TX (US); Liang Wu, Frisco, TX (US); Delon R Whetten, Allen, TX (US); Christopher E Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1773 days.

(21) Appl. No.: 09/850,384

(22) Filed: May 7, 2001

(51) Int. Cl.
*G06F 15/173* (2006.01)
*H04L 12/16* (2006.01)
*H04M 3/42* (2006.01)

(52) U.S. Cl. .................. 709/226; 709/223; 370/260; 370/265; 370/270; 370/271; 379/201.01; 379/201.03; 379/202.01

(58) Field of Classification Search .......... 709/223, 709/224, 226; 370/260, 265, 270, 271; 379/201.01, 379/201.03, 202.01
See application file for complete search history.

(56) References Cited

U.S. PATENT DOCUMENTS

| | | | | |
|---|---|---|---|---|
| 4,959,854 A | * | 9/1990 | Cave et al. | 379/157 |
| 5,440,563 A | * | 8/1995 | Isidoro et al. | 370/270 |
| 5,757,781 A | * | 5/1998 | Gilman et al. | 370/260 |
| 5,933,486 A | * | 8/1999 | Norby et al. | 379/221.09 |
| 5,974,134 A | * | 10/1999 | Park | 379/203.01 |
| 5,978,465 A | * | 11/1999 | Corduroy et al. | 379/265.02 |
| 6,044,367 A | * | 3/2000 | Wolff | 707/2 |
| 6,253,225 B1 | * | 6/2001 | Nakahara et al. | 718/100 |
| 6,304,645 B1 | * | 10/2001 | Holland et al. | 379/201.02 |
| 6,381,321 B1 | * | 4/2002 | Brown et al. | 379/270.02 |
| 6,393,481 B1 | * | 5/2002 | Deo et al. | 709/224 |
| 6,445,776 B1 | * | 9/2002 | Shank et al. | 379/88.1 |
| 6,460,082 B1 | * | 10/2002 | Lumelsky et al. | 709/226 |
| 6,512,918 B1 | * | 1/2003 | Malomsoky et al. | 455/403 |
| 6,570,879 B1 | * | 5/2003 | Kikuchi | 370/395.21 |
| 6,687,234 B1 | * | 2/2004 | Shaffer et al. | 370/260 |

OTHER PUBLICATIONS

Cisco CallManager Release 3.0(5); "Cisco IP Telephony Network Design Guide," Cisco Systems, Inc.

* cited by examiner

*Primary Examiner*—Kevin Bates
(74) *Attorney, Agent, or Firm*—Baker Botts L.L.P.

(57) ABSTRACT

A method for sharing distributed media resources includes determining at a first call manager that a telephony device controlled by the first call manager requires the use of a media resource device. The method further includes selecting an appropriate media resource device from a media resource group list associated with the telephony device. In addition, the method includes communicating an allocation request to a device process that is associated with the selected media resource device and that is executing at a second call manager controlling the selected media resource device.

41 Claims, 4 Drawing Sheets

SHARED DISTRIBUTION MEDIA RESOURCES IN A COMMUNICATION NETWORK

TECHNICAL FIELD OF THE INVENTION

This invention relates to the field of communications, and more particularly to shared distributed media resources in a communication network.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network. In addition to VoP telephony devices, such as IP telephones, a variety of different media resources may be provided in a communication network to enable and/or enhance VoP telecommunications.

SUMMARY OF THE INVENTION

According to the present invention, disadvantages and problems associated with previous packet telecommunication networks have been substantially reduced or eliminated.

According to one embodiment of the present invention, a method for sharing distributed media resources includes determining at a first call manager that a telephony device controlled by the first call manager requires the use of a media resource device. The method further includes selecting an appropriate media resource device from a media resource group list associated with the telephony device. In addition, the method includes communicating an allocation request to a device process that is associated with the selected media resource device and that is executing at a second call manager controlling the selected media resource device.

Embodiments of the present invention provide one or more of the following technical advantages. For example, particular embodiments of the present invention enable the sharing of distributed media resources between a number of call managers in a communication network. The use of the media resources may be based on media resource groups included in one or more media resource group lists. These media resource groups and lists may be globally used by all call managers in a particular communication network regardless of the relative locations of a call manager and a media resource device in a media resource group.

Therefore, particular embodiments of the present invention provide a large degree of flexibility in organizing and maintaining a communication network having multiple call managers. For example, since media resource devices included in a media resource group may be controlled by different call managers, if a media resource device loses its connection to a call manager, the media resource device can dynamically and automatically reregister with a different call manager without concern about the effect on the media resource group. Media resource devices may also be assigned to different call managers to provide load balancing between call managers. In addition, the ability to share media resource devices between call managers eliminates the need to provide a media resource device of each required type for each call manager, thus reducing the expense of establishing and maintaining the communication network. Furthermore, the use of media resource devices may be managed on a geographic, user privilege, or other appropriate basis or bases.

Other important technical advantages are readily apparent to those skilled in the art from the following figures, description and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
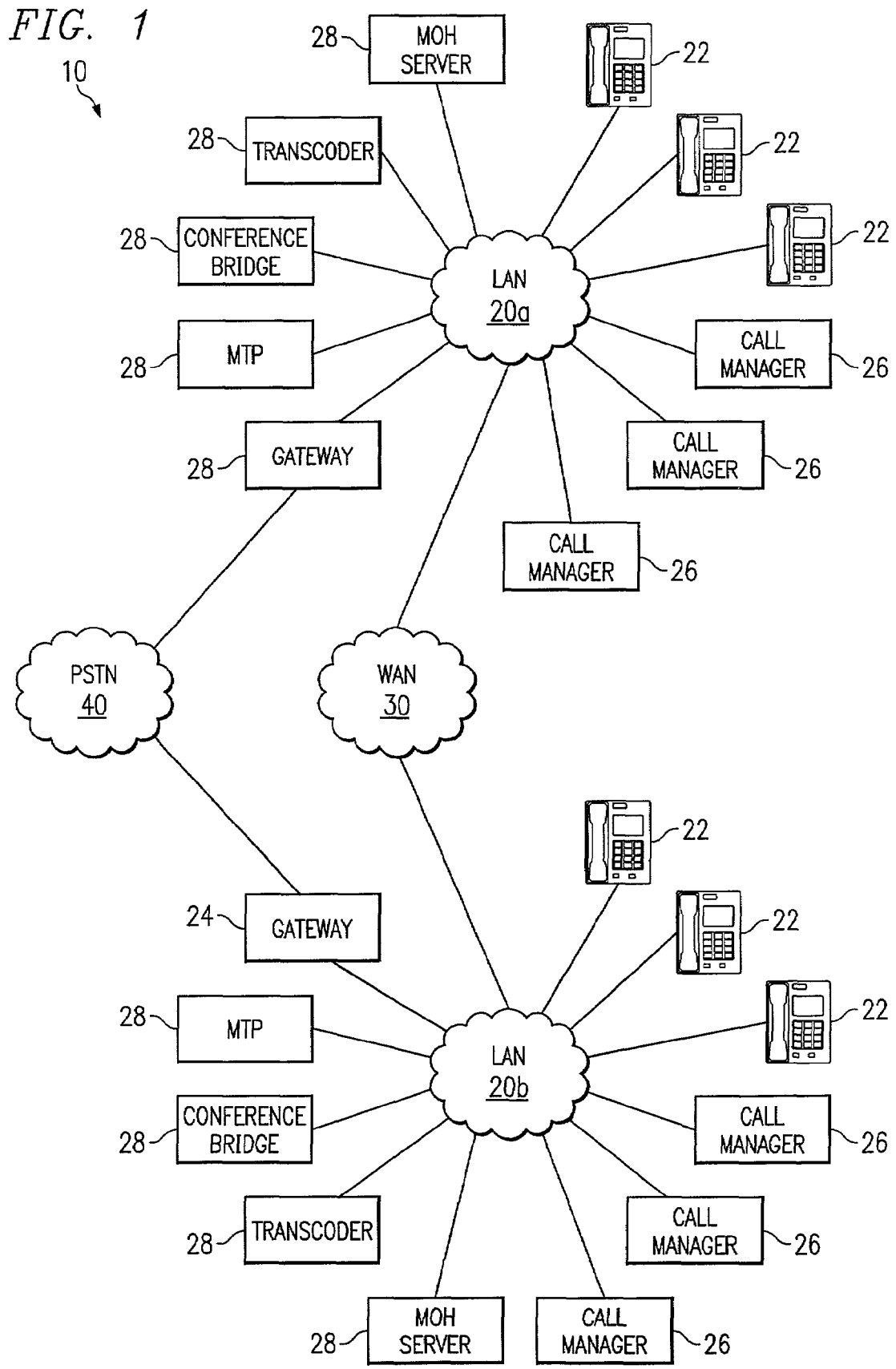
FIG. 1 illustrates an exemplary communication network in accordance with one embodiment of the present invention.

FIG. 1 illustrates an exemplary communication network 10. In the illustrated embodiment, communication network 10 includes a plurality of local area networks (LANs) 20 interconnected using a wide area network (WAN) 30. Each LAN 20 is a data communication network that is further operable to transmit audio and/or video telecommunications in packet form. In a particular embodiment, LANs 20 are Internet Protocol (IP) networks; however, LANs 20 may be any type of data communication network. Therefore, although the subsequent description will primarily focus on IP communications, it should be understood that other appropriate methods of transmitting telecommunications over a data network, such as a Frame Relay, ATM, or other packet-based networks, are also included within the scope of the present invention.

LANs 20 may be coupled to other IP networks including, but not limited to, other LANs 20 and/or one or more wide area networks (WANs) 30, such as the Internet. Although only a few exemplary networks are illustrated, it should be understood that any appropriate number of networks may be interconnected. Since IP networks share a common method of transmitting data, IP telecommunications may be transmitted between IP telephony devices 22 coupled to different, but interconnected, IP networks. In addition to being coupled to other IP networks, LANs 20 may also be coupled to non-IP telecommunication networks through the use of gateway devices 24. For example, LANs 20 may be coupled to the Public Switched Telephone Network (PSTN) 40. PSTN 40 includes switching stations, central offices, mobile telephone switching offices, pager switching offices, remote terminals, and other related telecommunications equipment. For example, LANs 20 may be coupled to selected central offices of PSTN 40 using gateway devices 24. Gateway devices 24 may be used to convert analog or digital circuit-switched data transmitted from PSTN 40 to packetized data transmitted by LANs 20, and vice-versa.

IP networks and other packet-based networks transmit data (including voice and video telecommunications) by placing the data in packets and sending each packet individually to the selected destination. Unlike a circuit-switched network (like PSTN 40), dedicated bandwidth is not required for the duration of a call or fax transmission over LANs 20 or WAN 30. Instead, each IP telephony device 22 communicates packets across the network as they become available for transmission. This feature makes bandwidth available for other data when voice or fax data is not being transmitted. The technology that allows telecommunications to be transmitted over an IP network (as well as other packet-based networks) may be referred to as Voice over Packet (VoP). IP telephony devices 22 have the capability of encapsulating a user's voice (or other media inputs, such as video) into IP packets so that the voice can be transmitted over LANs 20 and WAN 30. IP telephony devices 22 may include telephones, fax machines, computers running telephony software (such as MICROSOFT NETMEETING), H.323-compatible devices, or any other device capable of sending and receiving telecommunications (including audio, video, or any appropriate type of media) in an IP network.

Communication network 10 also includes a plurality of call managers 26 that control one or more IP telephony devices 22 and/or gateway devices 24. A call manager 26 is a component that controls call processing, routing, telephone features and options (such as call hold, call transfer and caller ID), device configuration, and other telephony functions and parameters within communication network 10. A call manager 26 can control IP telephony devices 22 and gateway devices 24 coupled to the same LAN 20 to which the call manager 26 is coupled and a call manager 26 may also control IP telephony devices 22 and gateways 24 located elsewhere in communications network 10. For example, a call manager 26 coupled to LAN 20a is capable of controlling telephony devices 22 coupled to LAN 20b. Call managers 26 may be implemented as software and/or hardware associated with one or more computers coupled to communication network 10. Call manager software may be embodied in any type of computer-readable medium including, but not limited to, memory, hard drives, diskettes, CD-ROMs, DVD-ROMs, or other optical or magnetic storage devices.

In addition to IP telephony devices 22 and gateway devices 24, call managers 26 may also control one or more media resource devices (MRDs) 28 coupled to communication network 10. MRDs 28 are used to provide various services to telephony devices 22 and gateway devices 24. MRDs 28 may include any device that may be inserted into a media stream between telephony devices 22 and/or gateway devices 24 (or any other appropriate IP endpoints) to provide a media-related service or any device to which a telephony device 22 or gateway device 24 (or any other appropriate IP endpoint) may be connected using a media stream to provide a media-related service to the telephony device 22 or gateway device 24. Examples of MRDs 28 may include, but are not limited to: a media termination point (MTP) that maintains a communication session with a telephony device 22 to provide supplementary services to the telephony device such as call hold, call transfer, or any other services where telephony device 22 is disconnected from an existing communication session with another device 22, 24; a conference bridge that mixes a number of incoming media streams from participants in a conference call and delivers an appropriate mixed stream to each participant; a transcoder that translates from one encoding format to another encoding format; and a music-on-hold (MOH) server that provides music or other media to a telephony device 22 when the telephony device 22 is placed on hold. As with telephony devices 22 and gateway devices 24, each call manager 26 may control the operation of any MRD 28 located in communication network and each MRD 28 may be shared by a number of call managers 26 in communication network 10. Therefore, an MRD 28 of each type does not need to be provided for each call manager 26 (thus greatly reducing the cost of implementing MRDs 28). MRDs 28 may be implemented using any appropriate combination of hardware and/or software at one or more locations.

When an IP telephony device 22, gateway device 24, or MRD 28 (collectively referred to as "devices") is connected to a LAN 20 or elsewhere in communication network 10 (or when a device otherwise comes on-line), the device may be assigned an IP address using Dynamic Host Control Protocol (DHCP) or another similar protocol or technique. The device may then register with any call manager 26 with which it can communicate using its telephone number or device name and its IP address. Alternatively, the device may request that it be assigned a telephone number/device name and/or an IP address. The term "telephone number" should be understood to include any appropriate combination of digits or characters or any other appropriate method of identifying a telephony device 22. The device may also report its media access control (MAC) address (or other appropriate LAN physical address), its device type, and/or other appropriate characteristics of the device. The call manager 26 with which a device has registered creates an internal device process, described below, that is used to route signaling to the device from call managers 26 or other devices.

The ability of a call manager 26 to control any device 22, 24, 28 in communication network 10 allows a call processing environment in which control of the devices may distributed dynamically in response to changes in communication network 10. For example, if a call manager 26 goes off-line, the devices controlled by that call manager 26 can connect and register with an alternative call manager 26 in communication network 10. Likewise, if a communication link between a device and a call manager 26 goes down, the device may connect and register with an alternative call manager 26 to which there is an operable communication path.

Furthermore, the distributed control of device also provides for network scalability and load-sharing by allowing device to be controlled by any call manager 26, regardless of physical location, in order to avoid excess load on a particular call manager 26 when new device come on-line or to provide load balancing between call managers 26. In addition, the ability to share MRDs 28 between call managers 26 eliminates the need to provide a MRD 28 of each type for each call manager 26, thus reducing the expense of establishing and maintaining communication network 10.

Figure 2:
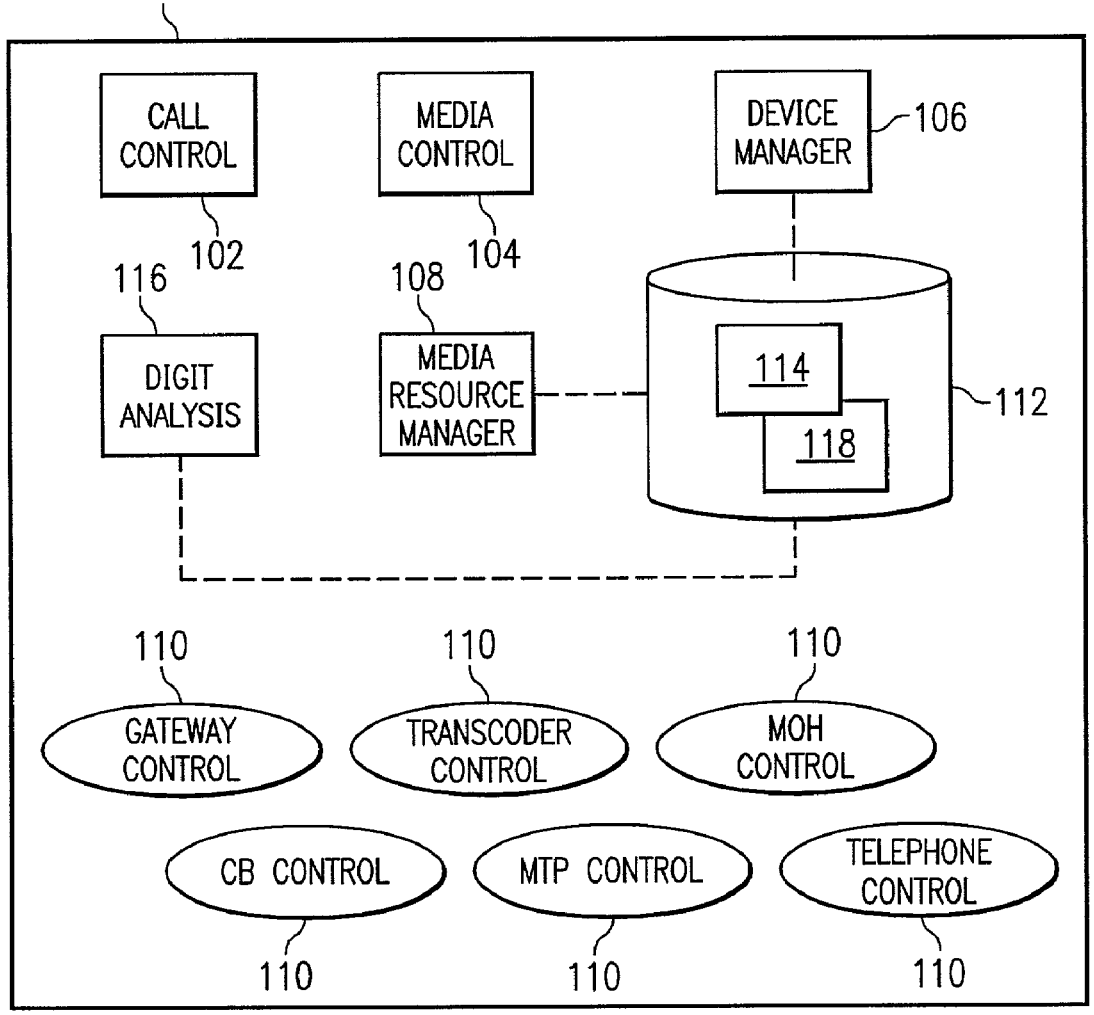
FIG. 2 illustrates exemplary functional components of a call manager in accordance with one embodiment of the present invention.

FIG. 2 illustrates exemplary functional components of a call manager 26. Call manager 26 includes a number of internal processes that are used to manage and control communication to and from devices 22, 24, 28. These processes include, but are not limited to, a call control module 102, a media control module 104, a device manager 106, an MRM 108, one or more device control processes 110, and a digit analysis module 116. Call control module 102 performs call processing tasks, such as establishing and terminating calls between multiple IP telephony devices 22 or between one or more IP telephony devices 22 and one or more non-IP telephony devices, such as telephony devices in PSTN 40, using a gateway device 24. Call control module 102 may also provide various calling features such as call transfer and call hold. Media control module 104 manages the establishment and termination of one or more appropriate media streams between devices 22, 24, 28.

In particular embodiments, each device 22, 24, 28 controlled by a particular call manager 26 has an associated device process 110 at the particular call manager 26. Although exemplary device processes 110 are illustrated for a gateway device 24, a conference bridge 28, a transcoder 28, an MTP 28, an MOH server 28, and a telephony device 22, a particular call manager 26 may control any appropriate number, type, and combination of devices 22, 24, 28. As an example only, a call manager 26 may control multiple telephony devices 22 and no gateways 24 or MRDs 28. An exemplary call manager 26 may alternatively control multiple MRDs 28 of a particular type (such as conference bridges), but may not control any MRDs 28 of another type. Furthermore, although different device processes 110 are illustrated for different types of MRDs 28, two or more different types of MRDs 28 may use the same type of device process 110 (although each active MRD 28 has its own associated device process 110).

Each device process 110 acts as a signaling contact point to the associated device 22, 24, 28. For example, signaling sent from a component of call manager 26 or signaling sent from another call manager 26 is directed to the appropriate device process 110, which then communicates the signaling to the associated device. Likewise, signaling sent from a device is first sent to the associated device process 110, and is then communicated to the appropriate destination. Signaling between devices and between call managers 26 may be performed using any appropriate signaling method including, but not limited to, a direct signaling technique in which a component of one call manager 26 may communicate directly with a device process 110 in another call manager 26.

When a MRD 28 coupled to a LAN 20 or any other appropriate location in communication network 10 comes on-line, the MRD 28 registers with a call manager 26. As described above, a MRD 28 can register with any call manager 26 with which the MRD 28 can communicate by sending the call manager 26 a registration request. An appropriate component of call manager 26 receives the registration request, generates a device process 110 for the registering MRD 28, and assigns the device process 110 a process identification number or string (PID). A PID provides a location or address at which a process 110 may be signaled, even if that process 110 is at a different call manager 26 than the component that is sending the signal. Thus, the PID enables call control module 102 or another appropriate process in one call manager 26 to directly communicate with a device process 110 in the same call manager 26 or another call manager 26.

Once initiated, the device process 110 may communicate information about the MRD 28, such as the device name, device type, and other device characteristics to data storage 112 or any other appropriate data storage location associated with call manager 26. Data storage 112, as well as any other data storage locations associated with call manager 26, may include any appropriate information storage location where information is stored in memory, in an magnetic storage medium, in an optical storage medium, or an any other appropriate storage medium. Furthermore, the information in data storage 112 may be accessible by other call managers 26, may be replicated to other call managers 26, or may be replicated to a central data storage location accessible by other call managers 26.

The device process 110 (or any other appropriate component) may also communicate the registering MRD's device process PID and appropriate device identification information (such as the device name) to device manager 106. Device manager 106 associates the PID and the identification information in a device name mapping table 114 that may be stored in data storage 112 or in any other appropriate data storage location. Device manager 106 (or other appropriate component) also notifies MRM 108 that the particular MRD 28 has registered and is active. MRM 108 is responsible for managing MRDs 28. Each telephony device 22 and gateway device 24 in communication network 10 may have an associated media resource group list (MRGL) that prioritizes MRDs 28 for use by that device 22, 24. Each MRGL includes an ordered list of one or more media resource groups, and each media resource group includes an ordered list of device names (and an associated device type) of one or more MRDs 28. It should be noted that a particular MRD 28 may be assigned to more than one media resource group and a particular media resource group may be assigned to more than one MRGL. As is described in further detail below, when a particular device 22, 24 requires or desires the use of an MRD 28, the MRGL for that device 22, 24 may be communicated to MRM 108 and MRM 108 may assign an appropriate MRD 28 based on the MRGL.

Telephony devices 22 and gateway devices 24 may register with call manager 26 in a similar fashion as MRDs. However, these devices 22, 24 may also provide additional (and/or different) information, such as telephone numbers of telephony devices 22 or telephone numbers associated with gateways 24, and this information may be stored in other tables or data storage locations than those described above. Furthermore, additional components may be included in call manager 26 to provide for the registration and use of telephony devices 22 and gateway devices 24. For example, call manager 26 may include a digit analysis module 116 that maintains a number mapping table 118 of telephone numbers or telephone number patterns (such as "214-xxx-xxxx") and PIDs of devices 22, 24 associated with each of the telephone numbers. As an example only, the telephone number "2056" may be associated with the device process 110 of a particular IP telephony device 22 and the telephone number pattern "214-xxx-xxxx" may be associated with the device process 110 of one or more gateway devices 24 coupled to PSTN 40 (for example, in a location where the local area code is "214"). The number mapping table 118 may be stored in any appropriate location.

When a telephony device 22 or gateway device 24 wishes to establish communications with another device in communication network 10, the originating device 22, 24 typically communicates one or more digits to the call manager 26 controlling the originating device 22, 24. The digits identify the destination device with which communication is requested. For example, a telephony device 22 may send a call manager 26 one or more digits indicating the telephone number of an IP telephony device 22 or a non-IP telephony device (such as a PSTN telephony device) to initiate a telephone call with the device. Alternatively, a gateway device 24 may communicate one or more digits to a call manager 26 identifying an IP telephony device 22 (or a non-IP telephony device coupled to the same or another gateway device 24) with which a non-IP telephony device desires to communicate.

In particular embodiments, digit inputs received by a call manager 26 are communicated to digit analysis module 116 of the call manager 26. Digit analysis module 116 may receive these digits directly from a device process 110, a call control module 102 (which received the digits from a device process 110), or any other suitable process or component in the same or a different call manager 26. Using number mapping table 118, digit analysis module 116 translates the received digit input into the PID of the device process 110 that is associated with the received digits. Digit analysis module 116 performs this translation using a table look-up in mapping table 118 or any other suitable process of determining the PID associated with the digits.

As an example, and not by way of limitation, assume that a first telephony device 22 communicates a call request including a digit string to an associated first device process 110 and that the digit string is a telephone number of a second telephony device 22 controlled by the same call manager 26. The first device process 110 receives the digit string and communicates the digits to call control module 102. Call control module 102 communicates the digits to digit analysis module 116 to determine the PID of the device process 110 associated with the digits (the PID of a second device process 110 associated with the second telephony device 22). Digit analysis module 116 performs a table look-up or any other suitable process of determining the PID associated with the digits and communicates the PID to call control module 102. Call control module 102 may then communicate with the second device process 110 to initiate a call or other communication between the first and second telephony devices 22.

If a MRD 28 is needed to establish, maintain, or otherwise enhance the call, call control module 102, media control module 104, or any another appropriate component of call manager 26 may make such a determination and request an appropriate MRD 28. For example, media control module 104 or another appropriate component may determine that the first and second telephony devices 22 use different encoding formats and that a transcoder 28 is needed for the telephony devices 22 to communicate. In such a case, media control module 104 may request a transcoder 28 from MRM 108. MRM 108 may then search an MRGL associated with one of the telephony devices 22 for an appropriate transcoder 28 and communicate the PID of the transcoder 28 to media control module 104. Similar processes may be used in conjunction with other MRDs 28.

In the example above, the requested communication was between two telephony devices 22 controlled by the same call manager 26. However, in many cases, devices 22, 24 controlled by different call managers 26 may wish to communicate. For example, due to the distributed nature of call managers 26 and the devices 22, 24 that they control, it is quite possible that two devices 22, 24 operated by an entity may be controlled by two different call managers 26. Therefore, digit analysis module 116 in each call manager 26 should not only maintain (in table 118) the PIDs of the device processes 110 associated with the devices 22, 24 that the call manager 26 controls ("local devices"), but also the PIDs of device processes 110 associated with devices 22, 24 controlled by other call managers 26 ("remote devices") with which communication might be desired. Similarly, an MRD 28 controlled by one call manager 26 may be requested by a component in another call manager 26. Therefore, device manager 106 in each call manager 26 should maintain (in table 114) device name to PID mappings for remote devices, such as remote MRDs 28.

Therefore, as devices 22, 24, 28 come on-line, go off-line or switch call managers 26, the information in mapping tables 114 and 118 in each call manager 26 needs to be updated. For this reason, each call manager 26 periodically communicates all or a portion of the information in tables 114, 118 relating to its local devices 22, 24, 28 to each of the other call managers 26. For example, each call manager 26 may communicate relevant information about a device 22, 24, 28 when that device registers with the call manager 26 and when the device unregisters with the call manager 26 (or is otherwise no longer controlled by the call manager 26). Furthermore, when a new call manager 26 comes on-line, the other call managers 26 may communicate the information in each of their tables 114, 118 (or at least the information relating to their local devices) to the new call manager 26. Similarly, when a call manager 26 goes off-line, the other call managers 26 may delete the entries relating to the devices that were controlled by the off-line call manager 26 (those devices will typically try to register with an on-line call manager 26).

Figure 3:
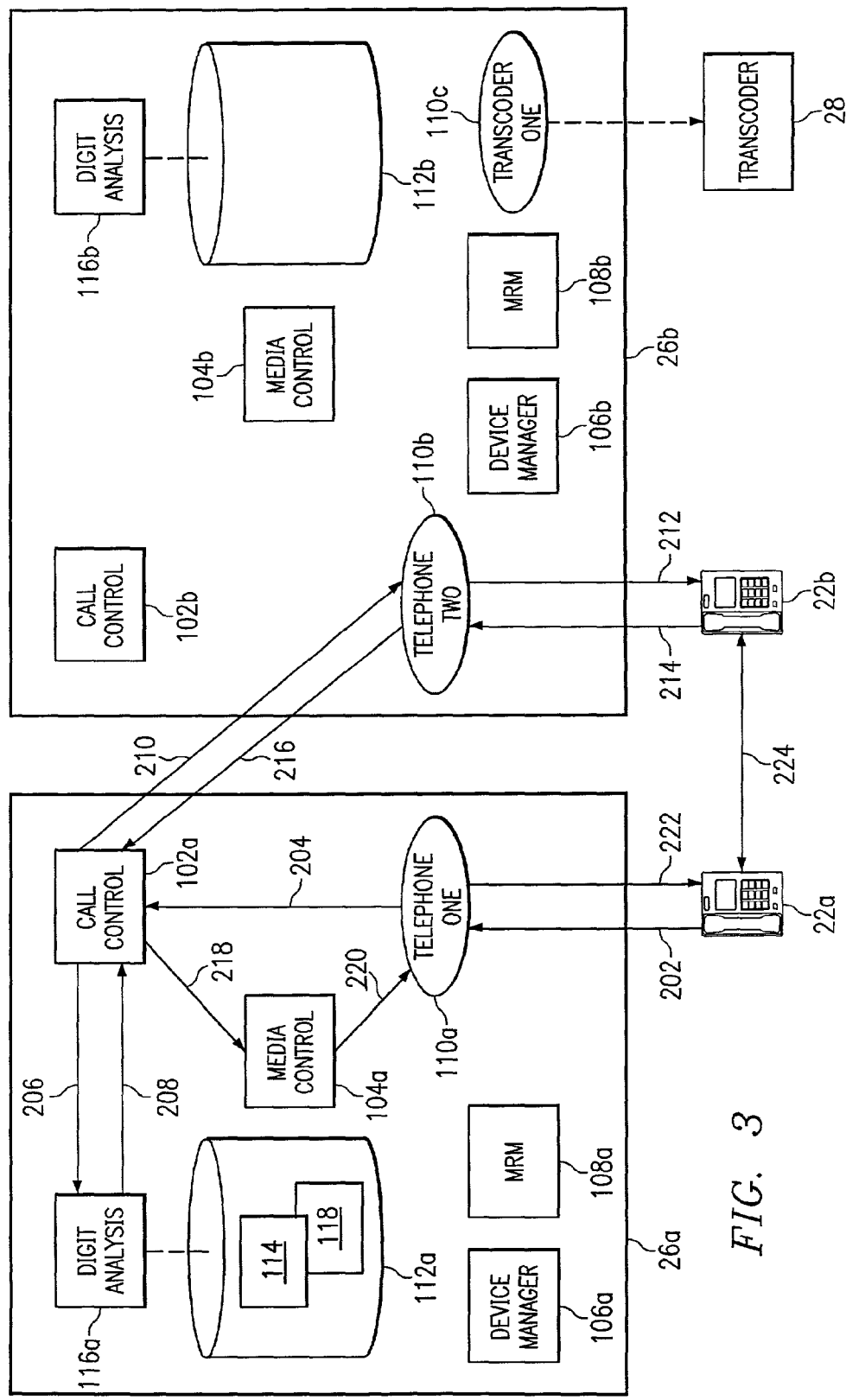
FIG. 3 illustrates an exemplary call routing process between call managers in a communication network.

FIG. 3 illustrates an exemplary call routing process between call managers 26a and 26b in communication network 10. In the illustrated embodiment, telephony device 22a is controlled by call manager 26a and telephony device 22b is controlled by call manager 26b. Call managers 26 and telephony devices 22 may be located anywhere in communication network 10. Although FIG. 3 illustrates a series of communications between different modules or processes in call managers 26a and 26b, other appropriate modules or processes may be involved in these communications, and the functions of one or more of the described modules or processes may be divided between multiple components or combined in a single component.

When a user wishes to place a call from IP telephony device 22a to IP telephony device 22b in communications network 10, the calling telephony device 22a communicates a call request signal to its associated device process 110a executed by call manager 26a, as indicated by arrow 202. The call request signal indicates the telephone number of called telephony device 22b. Device process 110a communicates the call request to call control module 102a as indicated by arrow 204, and call control module 102a communicates the telephone number of called telephony device 22b to digit analysis module 116a as indicated by arrow 206. Call control module 102a may communicate the telephone number as a whole or it may communicate each digit of the telephone number successively. Digit analysis module 116a obtains a PID associated with the telephone number (the PID of device process 110b) from number mapping table 118 stored in data storage 112 or in any other appropriate location, and communicates the PID to call control module 102a, as indicated by arrow 208.

Call control module 102a signals device process 110b with the call request, as indicated by arrow 210. Having received the call request signal from call control module 102a, device process 110b communicates the call request to telephony device 22b, as indicated by arrow 212. If called telephony device 22b is available to communicate with calling telephony device 22a, called telephony device 22b communicates a call proceed signal to device process 110b, as indicated by arrow 214. The call proceed signal may be any appropriate communication that indicates a device's availability or desire to proceed with a communication. Alternatively, device process 110b may know the availability of telephony device 22b without communicating the call request to telephony device 22b. Device process 110b communicates the call proceed signal to call control module 102a as indicated by arrow 216.

Call control module 102a may initiate the call by informing media control module 104 of the call proceed signal to device process 110a, as indicated by arrow 218. Media control module 104a signals device process 110a, as indicated by arrow 220, and indicates that media (audio and/or video) streaming should be established between telephony devices 22a and 22b. Alternatively, media streaming may be established first in one direction between telephony device 22a and an appropriate IP endpoint (such as telephony device 22b, an intermediate MRD 28, or any other appropriate endpoint), and then media streaming may established back to telephony device 22a from the answering device, such as telephony device 22b. Device process 110a signals calling telephony device 22a, as indicated by arrow 222, and instructs telephony device 22a to establish the media stream. A media streaming connection 224 is then established directly between telephony devices 22a and 22b. Furthermore, any other appropriate technique for establishing media streaming may be used. The call set-up and media stream establishment described above may be accomplished using the H.323 communication protocol (and its related protocols, such as H.225 and H.245) or any other appropriate communication protocol or protocols.

When media streaming connection 224 is established, the users of telephony devices 22a and 22b may begin to communicate. A codec (coder/decoder) in telephony devices 22a and 22b converts the media (for example, voice, video, or fax) signals generated by the users of telephony devices 22a and 22b from analog signals into digitally encoded data. The codec may be implemented as software and/or hardware in telephony devices 22a and 22b. The digitally encoded data is encapsulated into IP packets so that it can be transmitted between telephony devices 22a and 22b using media streaming connection 224. The encapsulation may be performed using Real-Time Transport Protocol (RTP) running over User Datagram Protocol (UDP), or any other suitable communication protocol. Once the packets have been received and reassembled at the destination telephony device 22, a codec in the destination telephony device 22 translates the digital data into analog audio and/or video signals for presentation to the user. The entire process is repeated each time that any call participant (or any other source) generates a media signal. In addition to calls between IP telephony devices 22, calls can also be placed to and received from non-IP telephony devices that are connected to PSTN 40 or any other appropriate non-IP network using gateways 24.

Figure 4:
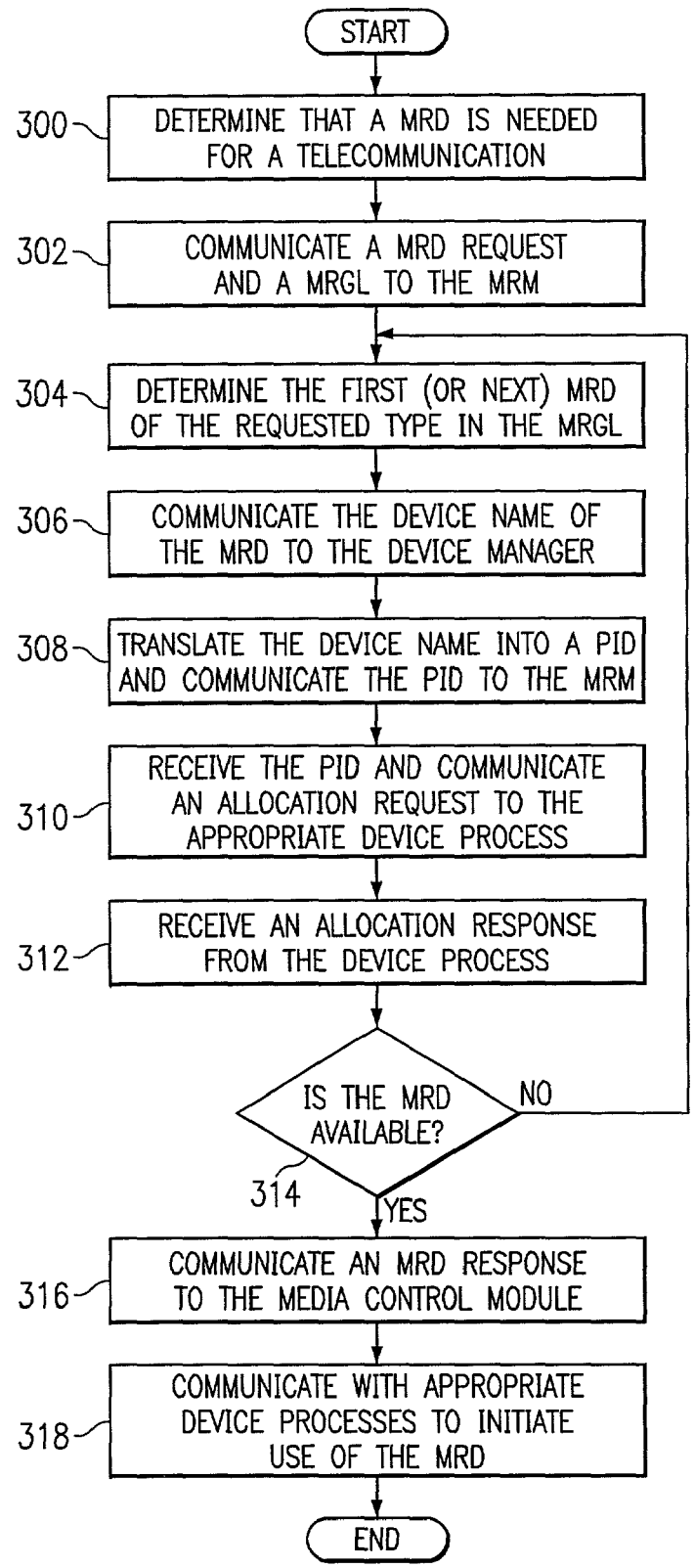
FIG. 4 illustrates an exemplary method for using a media resource device in conjunction with a telecommunication.

FIG. 4 illustrates an exemplary method for using an MRD 28 in conjunction with a telecommunication. In the exemplary method, a transcoder 28 is used in conjunction with the telephone call between telephony devices 22a and 22b described above in conjunction with FIG. 3. However, the exemplary method applies, at least in part, to the use of any other appropriate MRDs 28. As illustrated in FIG. 3, transcoder 28 is controlled by call manager 26b and has an associated device process 110c. However, transcoder 28 may be controlled by any appropriate call manager 26 in communication network 10. Before the start of the exemplary method, a call has been requested by telephony device 22a, call control 102a has received a call proceed signal from telephony device 22b, and call control 102a has informed media control module 104a of the call proceed signal, as described above.

The exemplary method begins at step 300 when media control module 104a determines that a transcoder 28 is needed for the telecommunication between telephony devices 22a and 22b. For example, media control module 104a may determine that telephony device 22a is using a codec that is not compatible with the codec used by telephony device 22b. Therefore, media control module 104a determines that a transcoder 28 needs to be inserted into the media stream between telephony devices 22a and 22b. At step 302, media control module 104a communicates an MRD request and a MRGL to MRM 108a. The MRD request includes the requested type of MRD 28 (which in this example is a transcoder).

As described above, each device 22, 24 in communication network 10 may have an associated MRGL that includes one or more ordered groups of MRDs 28. Media control module 104a may communicate an MRGL associated with either telephony device 22a or telephony device 22b, as appropriate. For example, telephony device 22a may use a G.723 codec that has an associated bit rate that is much lower than a G.711 codec used by telephony device 22b. In such a case, it may be appropriate to use a transcoder 28 that is located close to telephony device 22b so that the higher bit rate communications from telephony device 22b must only be communicated a short distance before being converted into the lower bit rate communications used by telephony device 22a. This may be especially important when telephony devices 22a and 22b are located a long distance from one another.

Therefore, in the example above, media control module 104a may communicate the MRGL associated with telephony device 22b to MRM 108a. Alternatively, media control module 104a may identify a MRGL stored by MRM 108a. As described below, an MRGL may be organized geographically so that MRDs 28 close to telephony device 22b may be requested before other MRDs 28. Media control module 104a may obtain the MRGL from any appropriate source. For example, telephony devices 22a and 22b may communicate their associated MRGL to any appropriate component of call manager 26a and/or 26b during the call initiation process or at any other appropriate time. This MRGL may be communicated to media control module 104a. Alternatively, an MRGL for telephony devices 22a and 22b may be stored in a data storage location associated with call managers 26a and 26b.

Furthermore, it should be understood that although media control module 104a is described as performing the steps associated with requesting a MRD 28, any other appropriate component of call manager 26a or 26b may perform this function. For example, other types of MRDs 28 may be requested by different components of a call manager 26. Moreover, an MRD 28 may be requested at any appropriate time and not necessarily before a call or other telecommunication is established between two or more devices 22, 24.

Returning to the exemplary method, MRM 108a receives the MRD request and MRGL and determines the first MRD 28 in the MRGL of the requested device type at step 304. As described above, each media resource group in the MRGL includes a list of device names of MRDs 28 and an associated device type. These media resource groups may be communicated as part of the MRGL or may be stored so that they are accessible by MRM 108a. MRM 108a starts at the top of the first media resource group and begins to search for the requested device type. If MRM 108a does not find an MRD 28 of the requested type in the first media resource group in the MRGL, MRM 108a continues searching in the next media resource group in the MRGL (assuming there is one). When MRM 108a finds the requested device type, MRM 108a communicates the device name of the MRD 28 (in this example, a transcoder) at step 306 to device manager 106a to obtain a PID of the device process 110 associated with the device name. At step 308, device manager 106a receives the device name, translates the device name into a PID using mapping table 114, and communicates the PID to MRM 108a. For this example, it is assumed that the PID identifies a device process 110c executing at call manager 26b and associated with transcoder 28.

MRM 108a receives the PID and communicates an allocation request to device process 110c at step 310. Device process 110c may communicate with transcoder 28 to determine its availability or device process 110c may know the availability of transcoder 28. In either case, device process 110c (or transcoder 28) communicates an allocation response to MRM 108a at step 312 indicating whether transcoder 28 is available for use. At step 314, MRM 108a receives the allocation response and determines whether transcoder 28 is available. If transcoder 28 is unavailable, the method returns to step 304 and MRM 108a continues searching for the next MRD 28 of the requested type in the appropriate MRGL. In the event that none of the MRDs 28 in the MRGL are available, MRM 108a may communicate an MRD response to media control module 104a indicating that no MRDs 28 are available. Similarly, if there are no MRDs 28 of the requested type in the MRGL or if there is an error in determining an MRD, MRM 108a may return a failure indication to media control module 104a. If transcoder 28 is available, MRM 108a communicates an MRD response to media control module 104a at step 316 indicating that transcoder 28 is available. This MRD response includes the PID of device process 110c. At step 318, media control layer 104a communicates with device processes 110a, 110b, and/or 110c to establish a media streaming connection between telephony devices 22a and 22b via transcoder 28, and the method ends.

As described above, other components besides media control module 104a may request an MRD 28 and/or an MRD 28 may be requested at other appropriate times other than when a telecommunication is being established. Furthermore, other types of MRDs 28 besides transcoder 28 may be used. For example, media control module 104a or any other appropriate component may determine that an MTP 28 is needed in case telephony device 22a desires to place telephony device 22b on hold or desires to transfer telephony device 22b to another device 22, 24. In such a case, an MTP 28 may be needed to maintain a communication session (such as an H.245 stream) with telephony device 22b while telephony device 22b is on hold or being transferred. Therefore, media control module 104a or another appropriate component may request an MTP 28 using the procedure described above. In such a case, the MRGL of telephony device 22b may be communicated to MRM 108a such that MTPs 28 close to telephony device 22b are requested first. As another example, a conference feature of call manager 26a or any other appropriate component may determine that telephony device 22a has requested that a conference call be established. The conference feature may request a conference bridge 28 and communicate an MRGL associated with telephony device 22a. As yet another example, call control module 102a or any other appropriate component may determine that a telephony device 22 has been placed on hold and may request a MOH server 28 to communicate music to the telephony device 22. Furthermore, any other appropriate types of MRDs 28 may be requested by any appropriate component of a call manager 26 at any appropriate time. Call control module 102, media control module 104, the conference feature, and any other appropriate components of a call manager 26 that may determine the need for and/or request an MRD 28 may be collectively referred to as "control modules."

As mentioned above, media resource groups may be used to order MRDs 28 according to geographic or any other appropriate characteristics. For example, if LAN 20a is located in Dallas and LAN 20b is located in San Jose, a media resource group may be created for MRDs 28 in Dallas and another media resource group may be created for MRDs 28 in San Jose. Each device 22, 24 in Dallas may then have a MRGL that first includes the Dallas media resource group and then includes the San Jose media resource group. Therefore, when a device 22, 24 in Dallas needs an MRD 28, the Dallas MRDs 28 may be requested before the San Jose MRDs 28 are requested.

Furthermore, any other appropriate characteristics may also be used to group MRDs. For example, MRDs 28 may also or alternatively be grouped based on the class of user. For instance, particular MRDs 28 may be placed in an "executive" or "manager" media resource group. Telephony devices 22, 24 assigned to executives or managers may then have such a group at the top of their MRGLs. On the other hand, telephony devices 22 associated with regular employees may not have the executive media resource group in their associated MRGL or the executive media resource group may be near the bottom of the MRGL (so that these MRDs 28 are not used unless all other MRDs 28 in the MRGL are unavailable). Moreover, particular types of MRDs 28 may be excluded from an MRGL associated with a particular telephony device 22. For example, one or more telephony devices 22 may be prevented from using a conference bridge 28. Furthermore, by assigning an empty MRGL to a telephony device 22, that telephony device 22 may be prevented from using any MRD 28.

In addition, characteristics may be combined to create media resource groups. For example, a media resource group may be created for executives in Dallas and for regular employees in Dallas. Therefore, an MRGL associated with a Dallas-based executive's telephony device 22 may include a Dallas executive media resource group, then a Dallas regular employee media resource group, then a San Jose executive media resource group, then a San Jose regular employee media resource group. Using such an MRGL, a MRM 108 first requests a set of MRDs 28 in Dallas that are reserved for executives, then tries the other MRDs 28 in Dallas, next tries a set of MRDs 28 in San Jose that are reserved for executives, and finally tries the other MRDs 28 in San Jose. Any other appropriate combination of characteristics may be used to create media resource groups.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for sharing distributed media resources, comprising:
    determining at a first call manager that a telephony device controlled by the first call manager requires the use of a media resource device;
    selecting an appropriate media resource device from a media resource group list associated with the telephony device, wherein the media resource group list comprises one or more media resource groups, each media resource group including a list of device names of one or more media resource devices and a device type associated with each device name, and wherein selecting an appropriate media resource device from the media resource group list comprises selecting a device name associated with a device type that is required by the telephony device; and
    communicating an allocation request to a device process associated with the selected media resource device, the device process executing at a second call manager controlling the selected media resource device.

2. The method of claim 1, wherein determining that the telephony device requires the use of a media resource device comprises determining that the telephony device desires to establish a telecommunication with a second telephony device and determining that a transcoder is required to establish the telecommunication.

3. The method of claim 1, wherein determining that the telephony device requires the use of a media resource device comprises determining that the telephony device desires to initiate a conference call.

4. The method of claim 1, wherein determining that the telephony device requires the use of a media resource device comprises determining that a media termination point is required to maintain a communication session with the telephony device.

5. The method of claim 1, wherein determining that the telephony device requires the use of a media resource device comprises determining that the telephony device has been placed on hold and may be connected to a music-on-hold server.

6. The method of claim 1, wherein:
the media resource group list includes a plurality of device names each identifying a media resource device; and
selecting an appropriate media resource device comprises selecting a device name from the media resource group list.

7. The method of claim 6, further comprising:
accessing a mapping table to determine a process identification (PID) associated with the selected device name, the PID identifying a device process associated with the media resource device identified by the device name; and
communicating the allocation request to the device process using the PID.

8. The method of claim 1, wherein:
the media resource groups are ordered in the media resource group list;
the device names are ordered in each media resource group; and
selecting an appropriate media resource device comprises searching through the media resource groups and the device names in each media resource group in order until a device name associated with the required device type is found.

9. The method of claim 1, wherein one or more of the media resource groups include only media resource devices located in the same geographic area.

10. The method of claim 1, wherein one or more of the media resource groups include only media resource devices for use by a particular class of user.

11. The method of claim 1, further comprising:
receiving an allocation response from the device process indicating that the selected media resource device is available; and
establishing a media streaming connection between the telephony device and the media resource device.

12. The method of claim 1, further comprising:
receiving an allocation response from the device process indicating that the selected media resource device is unavailable;
selecting a second appropriate media resource device from the media resource group list; and
communicating an allocation request to a second device process associated with the second media resource device.

13. The method of claim 1, further comprising receiving the media resource group list associated with the telephony device from the telephony device.

14. A call manager coupled to a packet-based network and operable to control a plurality of devices, the call manager comprising the following logic embodied in a computer-readable medium:
a control module operable to determine that a telephony device controlled by the call manager requires the use of a media resource device; and
a media resource manager operable to:
select an appropriate media resource device from a media resource group list associated with the telephony device, wherein the media resource group list comprises one or more media resource groups, each media resource group including a list of device names of one or more media resource devices and a device type associated with each device name, and wherein the media resource manager is operable to select a device name associated with a device type that is required by the telephony device; and
communicate an allocation request to a device process associated with the selected media resource device, the device process executing at a second call manager controlling the selected media resource device.

15. The call manager of claim 14, wherein the control module comprises a call control module.

16. The call manager of claim 14, wherein the control module comprises a media control module.

17. The call manager of claim 14, wherein determining that the telephony device requires the use of a media resource device comprises determining that the telephony device desires to establish a telecommunication with a second telephony device and determining that a transcoder is required to establish the telecommunication.

18. The call manager of claim 14, wherein determining that the telephony device requires the use of a media resource device comprises determining that the telephony device desires to initiate a conference call.

19. The call manager of claim 14, wherein determining that the telephony device requires the use of a media resource device comprises determining that a media termination point is required to maintain a communication session with the telephony device.

20. The call manager of claim 14, wherein determining that the telephony device requires the use of a media resource device comprises determining that the telephony device has been placed on hold and may be connected to a music-on-hold server.

21. The call manager of claim 14, wherein:
the media resource group list includes a plurality of device names each identifying a media resource device; and
the media resource manager is operable to select a device name from the media resource group list.

22. The call manager of claim 21, further comprising a device manager operable to:
receive the device name from the media resource manager;
access a mapping table to determine a process identification (PID) associated with the device name, the PID identifying a device process associated with the media resource device identified by the device name; and
communicating the PID to the media resource manager for use in communicating the allocation request to the media resource device.

23. The call manager of claim 14, wherein:
the media resource groups are ordered in the media resource group list;
the device names are ordered in each media resource group; and
the media resource manager is operable to search through the media resource groups and the device names in each media resource group in order until a device name associated with the required device type is found.

24. The call manager of claim 14, wherein one or more of the media resource groups include only media resource devices located in the same geographic area.

25. The call manager of claim 14, wherein one or more of the media resource groups include only media resource devices for use by a particular class of user.

26. The call manager of claim 14, wherein:
the media resource manager is further operable to receive an allocation response from the device process indicating that the selected media resource device is available; and
the control module is further operable to establish a media streaming connection between the telephony device and the media resource device in response to the allocation response.

27. The call manager of claim 14, wherein the media resource manager is further operable to:
receive an allocation response from the device process indicating that the selected media resource device is unavailable;
select a second appropriate media resource device from the media resource group list; and
communicate an allocation request to a second device process associated with the second media resource device.

28. The call manager of claim 14, wherein the control module is further operable to:
receive the media resource group list associated with the telephony device from the telephony device; and
communicate the media resource group list to the media resource manager.

29. Call manager software embodied in a computer-readable medium and operable to:
determine that a telephony device controlled by the call manager software requires the use of a media resource device;
select an appropriate media resource device from a media resource group list associated with the telephony device, wherein the media resource group list comprises one or more media resource groups, each media resource group including a list of device names of one or more media resource devices and a device type associated with each device name, and wherein the call manager software is operable to select an appropriate media resource device from the media resource group list by selecting a device name associated with a device type that is required by the telephony device; and
communicate an allocation request to a device process associated with the selected media resource device, the device process associated with other call manager software controlling the selected media resource device.

30. The software of claim 29, wherein determining that the telephony device requires the use of a media resource device comprises determining that the telephony device desires to establish a telecommunication with a second telephony device and determining that a transcoder is required to establish the telecommunication.

31. The software of claim 29, wherein determining that the telephony device requires the use of a media resource device comprises determining that the telephony device desires to initiate a conference call.

32. The software of claim 29, wherein determining that the telephony device requires the use of a media resource device comprises determining that a media termination point is required to maintain a communication session with the telephony device.

33. The software of claim 29, wherein determining that the telephony device requires the use of a media resource device comprises determining that the telephony device has been placed on hold and may be connected to a music-on-hold server.

34. The software of claim 29, wherein:
the media resource group list includes a plurality of device names each identifying a media resource device; and
selecting an appropriate media resource device comprises selecting a device name from the media resource group list.

35. The software of claim 34, further operable to:
access a mapping table to determine a process identification (PID) associated with the selected device name, the PID identifying a device process associated with the media resource device identified by the device name; and
communicate the allocation request to the device process using the PID.

36. The software of claim 29, wherein:
the media resource groups are ordered in the media resource group list;
the device names are ordered in each media resource group; and
selecting an appropriate media resource device comprises searching through the media resource groups and the device names in each media resource group in order until a device name associated with the required device type is found.

37. The software of claim 29, wherein one or more of the media resource groups include only media resource devices located in the same geographic area.

38. The software of claim 29, wherein one or more of the media resource groups include only media resource devices for use by a particular class of user.

39. The software of claim 29, further operable to:
receive an allocation response from the device process indicating that the selected media resource device is available; and
establish a media streaming connection between the telephony device and the media resource device.

40. The software of claim 29, further operable to:
receive an allocation response from the device process indicating that the selected media resource device is unavailable;
select a second appropriate media resource device from the media resource group list; and
communicate an allocation request to a second device process associated with the second media resource device.

41. The software of claim 29, further operable to receive the media resource group list associated with the telephony device from the telephony device.

* * * * *